United States Patent
Cha (10) Patent No.: US 7,382,413 B2
(45) Date of Patent: Jun. 3, 2008

(54) APPARATUS AND METHOD OF EXTRACTING SYNC SIGNAL FROM ANALOG COMPOSITE VIDEO SIGNAL

(75) Inventor: Tae-hwan Cha, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 568 days.

(21) Appl. No.: 11/143,453

(22) Filed: Jun. 3, 2005

(65) Prior Publication Data

US 2005/0280738 A1 Dec. 22, 2005

(30) Foreign Application Priority Data

Jun. 21, 2004 (KR) ............. 10-2004-0046096

(51) Int. Cl.
*H04N 5/04* (2006.01)
(52) U.S. Cl. .................................. 348/524
(58) Field of Classification Search ........ 348/525, 348/524, 530–532, 537, 464, 465; 375/354, 375/365
See application file for complete search history.

(56) References Cited

U.S. PATENT DOCUMENTS

| | | | | |
|---|---|---|---|---|
| 4,672,447 A | * | 6/1987 | Moring et al. ........... | 348/537 |
| 6,445,420 B1 | * | 9/2002 | Kim ......................... | 348/465 |
| 7,098,961 B2 | * | 8/2006 | Scott et al. ............... | 348/531 |
| 2005/0174487 A1 | * | 8/2005 | O'Connell ................ | 348/525 |
| 2005/0195326 A1 | * | 9/2005 | Kudou ..................... | 348/465 |

FOREIGN PATENT DOCUMENTS

| | | |
|---|---|---|
| KR | 08-26568 | 1/1996 |
| KR | 1998-16570 | 6/1998 |
| KR | 2000-37633 A | 7/2000 |
| KR | 2001-64714 A | 7/2001 |
| KR | 2003-30730 A | 4/2003 |

* cited by examiner

*Primary Examiner*—Paulos M. Natnael
(74) *Attorney, Agent, or Firm*—Stanzione & Kim, LLP

(57) ABSTRACT

An apparatus and method of extracting a sync signal from an analog composite video signal includes a controller to decide whether a horizontal sync signal in the analog composite video signal is a distorted abnormal signal, and extracts the horizontal sync signal from the composite video signal using a separate counter if the analog composite video signal is the distorted abnormal signal A sync signal can be precisely extracted from the distorted abnormal signal. Therefore, an overall system synchronization of the apparatus can be stable, and distortions in output images can be prevented.

20 Claims, 5 Drawing Sheets

APPARATUS AND METHOD OF EXTRACTING SYNC SIGNAL FROM ANALOG COMPOSITE VIDEO SIGNAL

CROSS-REFERENCE TO RELATED APPLICATIONS

This application claims benefit under 35 U.S.C. § 119 from Korean Patent Application No. 2004-46096, filed on Jun. 21, 2004, the entire content of which is incorporated herein by reference.

BACKGROUND OF THE INVENTION

1. Field of the Invention

The present general inventive concept relates to an apparatus to extract a sync signal from an analog composite video signal, and more specifically, to an apparatus and method of precisely extracting a sync signal even from a distorted analog composite video signal, thereby preventing distortions in output images.

2. Description of the Related Art

In general, an analog broadcast receiver is required to receive analog broadcasts including NTSC, PAL and SECAM. Despite a high level of availability of digital broadcasts, a large number of viewers still use an analog broadcast receiver. For this reason, analog and digital broadcasts are often simulcasted, and even digital broadcast receivers have a receiving end for receiving the analog broadcasts as well.

In the analog broadcast receiver, if an analog broadcast channel is selected, a tuner receives corresponding radio frequency signals and produces video intermediate frequency signals VIF, such as 45.75 MHz. The video intermediate frequency signal VIF is inputted to a video detector circuit, and the video detector circuit detects the VIF signal and demodulates it to a composite video signal, such as a CVBS signal including color, video, burst, and sync signals. The composite video signal is then inputted to a video decoder and decomposed into an RGB signal for reproducing real colors which are displayed on a display device such as a CRT.

In general, the video decoder extracts the sync signal from the CVBS signal through sync falling edge detection and the sync averaging (to be described later). A system clock is generated using a separated sync average.

Figure 1A:
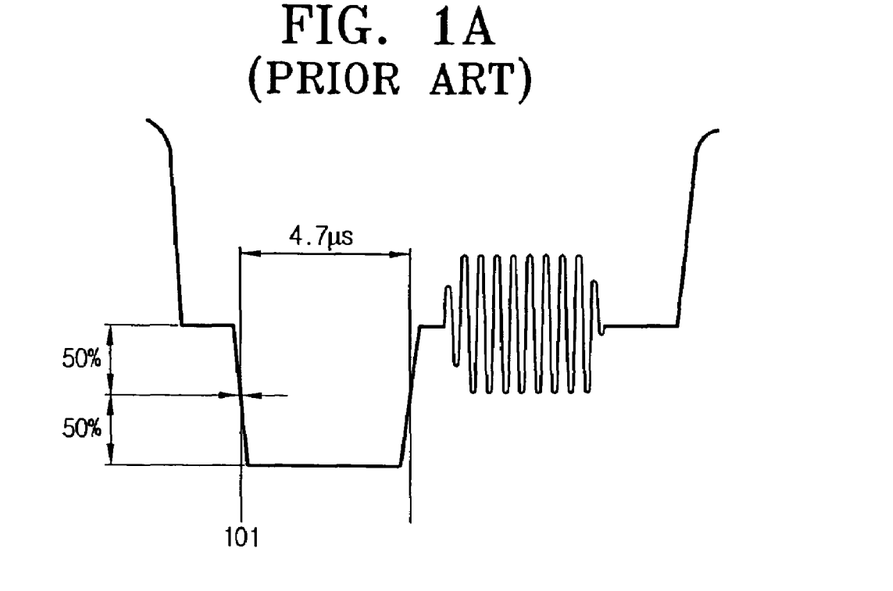
FIG. 1A and FIG. 1B are explanatory diagrams illustrating a conventional method for extracting a sync signal from a composite video signal.
Figure 1B:
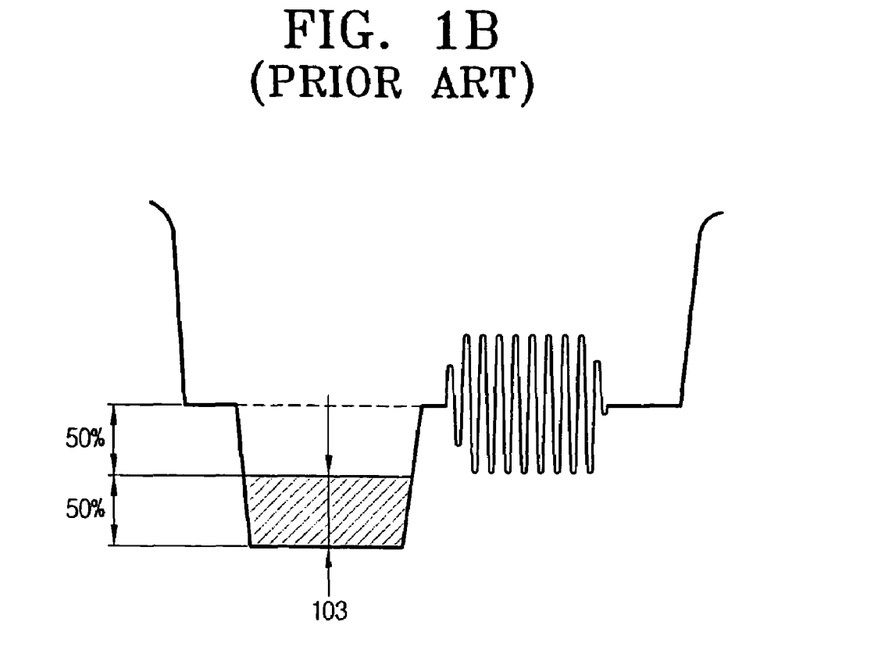

FIG. 1A and FIG. 1B are diagrams illustrating a conventional method for extracting a sync signal from a composite video signal. Waveforms depicted in FIGS. 1A and 1B correspond to horizontal sync signals based on the NTSC system.

FIG. 1A describes a method for sync falling edge detection. The method includes detecting a point of half an amplitude of a falling edge of the sync signal. Using a point 101 having a 50% amplitude of the falling edge as a starting position of the horizontal sync signal, an already known rising edge and a vertical sync signal are detected, and a system clock is generated thereby.

FIG. 1B describes a method for sync averaging. The method includes finding a part having 50% of a total area of an incoming horizontal sync signal. At first, an amplitude of a falling edge is divided into two parts, and an area in a lower half is obtained. Using a part (or line) 103, that divides the area marked with slant lines into two equal sub-areas, as a starting point of the horizontal sync signal, a system clock is generated.

However, a problem arises because a normal composite video signal is not always inputted to a video decoder as shown in FIG. 1A or FIG. 1B. For instance, the falling edge or a bottom part of the horizontal sync signal is distorted and then inputted to the video decoder.

Figure 2A:
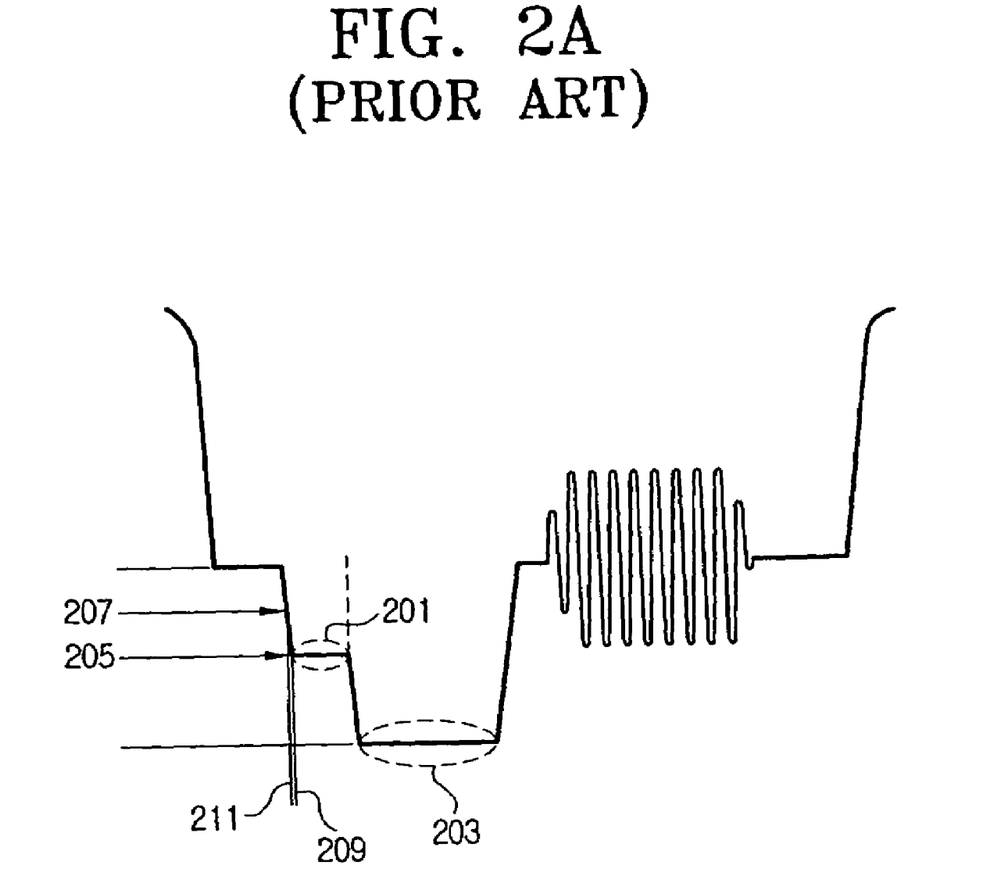
FIGS. 2A through 2C are explanatory diagrams illustrating an abnormal sync extracted from an abnormal composite video signal.
Figure 2B:
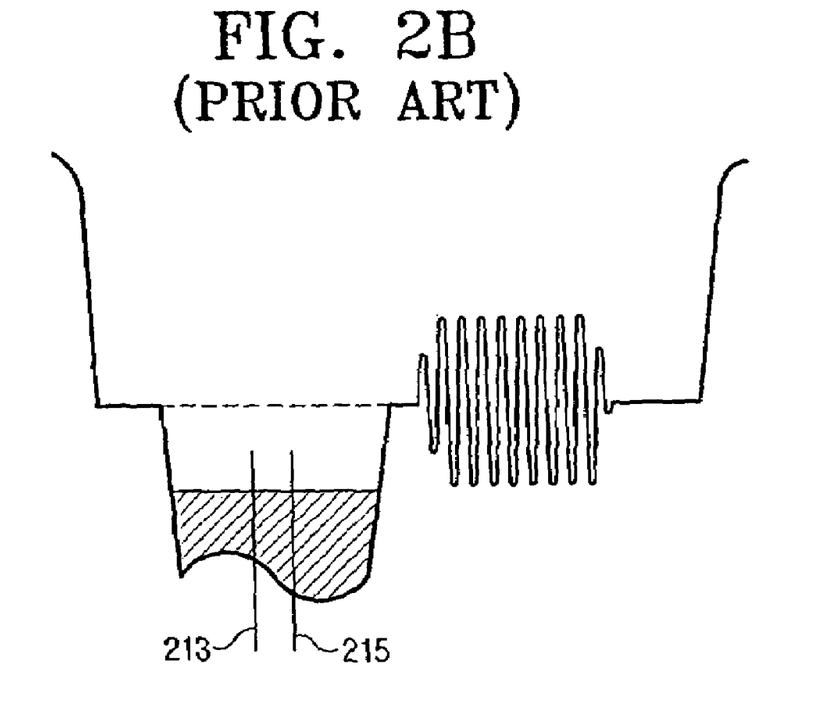
Figure 2C:
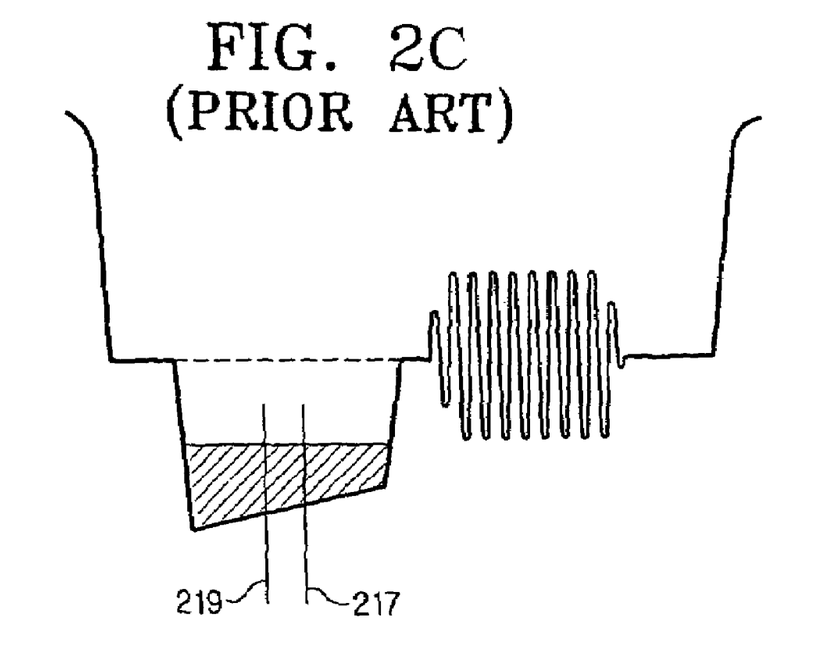

FIGS. 2A through 2C are diagrams illustrating methods of extracting an abnormal sync signal from an abnormal composite video signal input.

If a waveform of a video signal shown in FIG. 2A is inputted, the extraction of the sync signal by the sync averaging can be accomplished without causing any problem. Unfortunately, however, when the sync signal is extracted by detecting a falling edge thereof, it is very difficult to know precisely where a bottom 203 of a horizontal sync signal is. As a result, a point 207, not a point 205, is read as a 50% amplitude point on the falling edge, and so, a point 211, not a point 209, is regarded as a starting point of the horizontal sync signal.

Similarly, waveforms shown in FIGS. 2B and 2C are generated if a bottom of an incoming horizontal sync signal is distorted. In this case, however, the sync falling edge detection is a suitable method for sync extraction. If the sync averaging method were applied, a point 215 and a point 219, not points 213 and 217, could be regarded as the starting point of the horizontal sync signal.

Therefore, when the horizontal sync signal wiggles and is not rock stable, a system clock thereof is also affected. Consequently, images on a screen are not quite as sharp, and a HPLL (Horizontal Phase Locked Loop) may be deviated, thereby causing distortions in the images.

SUMMARY OF THE INVENTION

The present general inventive concept provides an apparatus and method of extracting a sync signal from an analog composite video signal so that a normal horizontal sync signal and a normal system clock can be precisely extracted and generated even though a horizontal sync signal inputted to a video decoder may have been distorted.

Additional aspects and advantages of the present general inventive concept will be set forth in part in the description which follows and, in part, will be obvious from the description, or may be learned by practice of the general inventive concept.

The foregoing and/or other aspects and advantages of present inventive concept may be achieved by providing a method of extracting a sync signal from an analog composite video signal, the method including receiving the composite video signal including a horizontal sync signal, dividing a portion of a falling edge of the horizontal sync signal in the composite video signal, in which the portion is disposed between a starting position of the falling edge and an end position of the falling edge, into a designated number of points, and deciding whether the composite video signal is an abnormal signal according to amplitude values at respective points, if the composite video signal is the abnormal signal, generating the falling edge of the horizontal sync signal starting from a point that is obtained by adding a designated time to a falling edge of a previous sync signal.

The method may further include if the composite video signal is not an abnormal signal, generating the falling edge of the horizontal sync signal, the falling edge starting from one of the points having an intermediate value of the amplitude values.

The method may further include generating a rising edge of the horizontal sync signal and a vertical sync signal after a lapse of a predetermined time from the generated falling edge.

The method may further include performing low-pass filtering to remove a high frequency noise from the composite video signal.

The method may further include whether the amplitude value keeps decreasing, and if the amplitude starts increasing again at least once, it is decided that the composite video signal is the abnormal signal.

The number of points may be calculated from sampling positions of the composite video signal according to a sampling frequency which is greater than twice of a frequency of the composite video signal.

The method may further include converting the filtered composite video signal into a digital signal, so that the amplitude values are obtained from the digital signal.

The foregoing and other aspects and advantages of the present general inventive concept may also be achieved by providing an apparatus to extract a sync signal from an analog composite video signal, the apparatus including a measuring unit to receive the composite video signal, to divide a portion of a falling edge of a horizontal sync signal in the composite video signal, in which the portion is disposed a starting portion of the falling edge and an end portion of the falling edge, into a designated number of points, and to obtain and output amplitude values at respective points, a counter to count a predetermined period of time from a falling edge of a previous sync signal, and a controller to compare each of the amplitude values outputted from the measuring unit with a previously received amplitude value, and if the each of the amplitude values is greater than the previously received amplitude value at least once, to decide that the composite video signal is an abnormal signal, and to generate a sync signal by designating one of the points corresponding to the predetermined period of time counted by the counter as the falling edge of the horizontal sync signal.

If the composite video signal is not the abnormal signal, the controller may generate the sync signal by designating one of the points having an intermediate value of the amplitude values as the falling edge of the horizontal sync signal.

The controller may calculate a predetermined time from the generated falling edge to generate a rising edge of the horizontal sync signal and a vertical sync signal.

The apparatus may further include a low-pass filter to remove high frequency noise from the composite video signal, and to output the filtered signal to the measuring unit.

The number of points may be calculated from sampling positions of the composite video signal according to a sampling frequency which is greater than twice of a frequency of the composite video signal.

The measuring unit may convert the composite video signal into a digital signal and obtains the amplitude values from the digital signal.

The measuring unit, the counter and the controller can be implemented within a single chip.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 3:
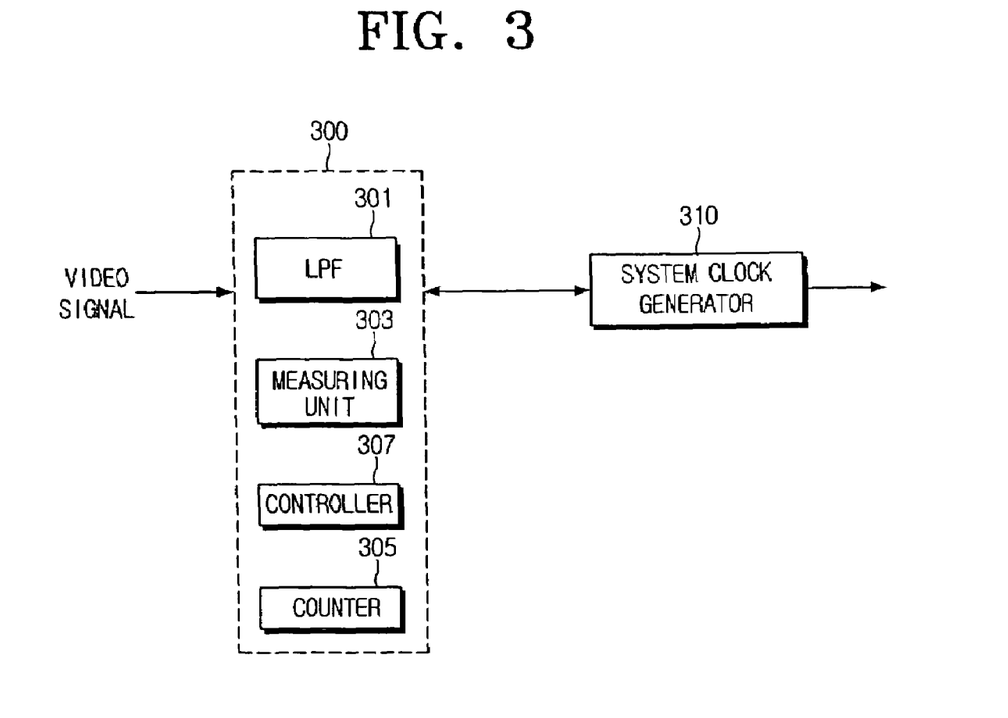
FIG. 3 is a schematic block diagram illustrating an apparatus to extract a sync signal from an analog composite video signal according to an embodiment of the present general inventive concept.

FIG. 3 is a schematic block diagram illustrating an apparatus to extract a sync signal from a composite signal, for example, an analog composite video signal, according to an embodiment of the present general inventive concept. As shown in FIG. 3, the apparatus 300 (hereinafter it will be referred to as "sync separator") includes a low-pass filter 301, a measuring unit 303, a counter 305, and a controller 307. The sync separator 300 is connected to a system clock generator 310. Here, the sync separator 300 is an apparatus that separates a horizontal sync signal from the composite video signal, and makes the system clock generator 310 generate a system clock (signal) according to the separated horizontal sync signal. The system clock can be synchronized with the separated horizontal sync signal.

The low-pass filter (LPF) 301 filters the composite video signal to remove a high frequency signal from the composite video signal and outputs the filtered composite video signal to the measuring unit 303. That is, the low-pass filter 301 blocks an unwanted high frequency noise that might have been inserted into the composite video signal through radio broadcasting channels or a VCR (Video Cassette Recorder).

The measuring unit 303 receives the filtered composite video signal from the low-pass filter 301, and checks a starting point of a falling edge of the composite video signal. The measuring unit 303 divides a portion of the falling edge (i.e., the portion from a starting portion of the falling edge to an end portion of the falling edge) by a designated number of points, for example, 'n,' and measures amplitude values Y(n) at respective points n, and outputs the amplitude value Y(n) to the controller 307.

The analog composite video signal can be a signal including the horizontal sync signal, a vertical sync signal, and a video signal, and can be detected from a radio broadcasting channel or inputted from the VCR in an image processing apparatus having the sync separator 300. The composite video signal may have a distorted horizontal sync signal, as illustrated in FIGS. 2A through 2C. Hereinafter, the composite video signal having a distorted or de-shaped horizontal sync signal will be referred to as 'abnormal signal.'

To obtain the amplitude value at each point, the measuring unit 303 first converts the composite video signal into a digital signal (digital composite video signal). To this end, the measuring unit 303 performs signal sampling on the composite video signal at a frequency greater than twice of a frequency band of the composite video signal.

Figure 4:
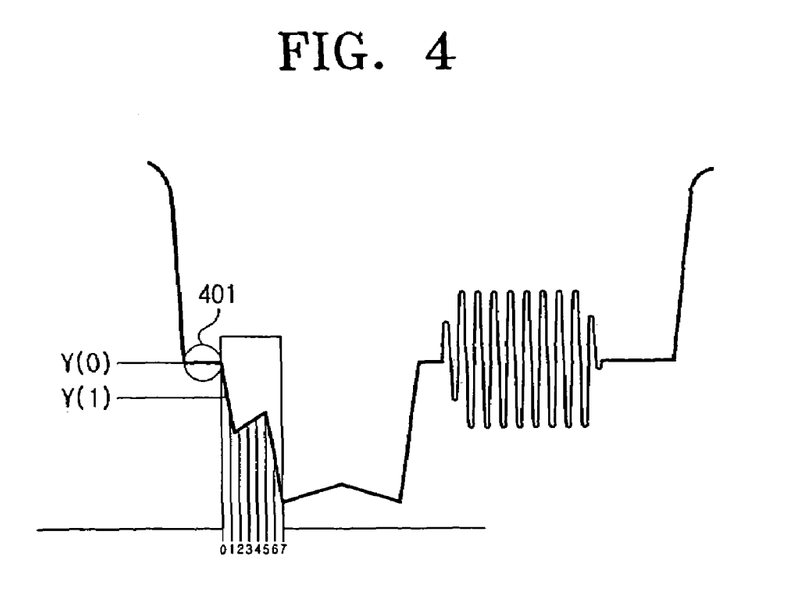
FIG. 4 is a diagram illustrating a measurement of an amplitude value of the analog composite video signal using a measuring unit of FIG. 3.

FIG. 4 is a diagram illustrating a measurement of an amplitude value of a composite video signal using the measuring unit 303 of FIG. 3.

In particular, the composite video signal shown in FIG. 4 has the distorted or de-shaped horizontal sync signal. Also, it is assumed that n=8.

At first, the measuring unit 303 checks a starting point of the falling edge of the horizontal sync signal. To this end, the measuring unit 303 compares an amplitude value of a front portion 401 of the digital composite video signal with a predetermined reference value, and designates one of the points where the amplitude value is reduced as the starting point of the falling edge. This method is for illustrative purposes only, and so, other techniques can be applied as well. The front portion 401 may correspond to a front porch or a pedestal level of the composite video signal, and the one of the points corresponding to the starting point of the falling edge may have an amplitude value or level lower than that of the front portion 401.

The number of the points 'n' may be calculated from sampling positions of the composite video signal according to a sampling frequency which is greater than twice of a frequency of the composite video signal. If not, the distortion of the horizontal sync signal of the composite video signal may not be recognized at all. In order to avoid this problem, it is possible to use the sampling positions at which the analog composite video signal is converted and digitalized into the digital signal, as the respective points to measure the amplitude values.

The counter 305 counts a predetermined time under a control of the controller 307. In other words, the controller 307 controls the counter 305 to start counting a time from the starting point of the horizontal sync signal. Here, the predetermined time can be an average horizontal sync period. The counter 305 informs the controller 307 that the predetermined time has been counted.

The controller 307 receives from the measuring unit 303 the amplitude value of the composite video signal from the starting point of the falling edge to the end of the falling edge, and detects the horizontal sync signal therefrom, and then outputs the detected horizontal sync signal to the system clock generator 310. That is, the controller 307 detects the horizontal sync signal using the sync falling edge detection method. To detect the horizontal sync signal, therefore, the controller 307 selects an intermediate value (or mid-point) from among the 'n' amplitude values inputted from the measuring unit 303, and recognizes the mid-point as the falling edge of the horizontal sync signal.

To this end, the controller 307 first decides whether the composite video signal is the abnormal signal, and detects the horizontal sync signal depending upon the decision.

In order to decide whether the composite video signal is the abnormal signal, the controller 307 obtains the amplitude value Y(n) from the measuring unit 303, and a differential value f(n) calculated from the following Equation 1.

$$f(n)=Y(n)-Y(n-1)$$ [Equation 1]

where n indicates a point between 0 and (n−1), Y(n) indicates an amplitude value of the composite video signal at the n-th point, and Y(n−1) indicates an amplitude value of the composite video signal at the (n−1)-th point right before the n-th point. Meanwhile, 'n' in the f(n) value is between 1 and (n−1). Normally, the differential value f(n) on the falling edge of the composite video signal has a negative (−) value.

The controller 307 sequentially receives a total of the 'n' amplitude values from the measuring unit 303.

If the calculation result of the differential value f(n) is not a negative value but a positive value at least once, the controller 307 decides that the composite video signal is the abnormal signal. The controller 307 can also find out whether the composite video signal is abnormal by comparing a sum of the differential values f(n) with a predetermined value.

If it turns out that the composite video signal is indeed the abnormal signal, the controller 307 awaits a signal from the counter 305, notifying that the predetermined time has been counted. From the time the signal is transmitted, the controller 307 starts recognizing and detecting the horizontal sync signal.

According to another embodiment, the controller 307 recognizes a point of the intermediate value selected among the amplitude values Y(n) excluding a certain amplitude value Y(n) corresponding to the differential value f(n) of the positive value, as a falling edge of the horizontal sync signal to detect the horizontal sync signal.

After detecting the falling edge of the horizontal sync signal, the controller 307 resets the counter 305 to start counting the predetermined time again.

The controller 307 calculates an already-known time from the detected falling edge of the horizontal sync signal, and generates a rising edge of the horizontal sync signal and a vertical sync signal.

The measuring unit 303, the counter 305 and the controller 307 of the sync separator 300 can be implemented in a single chip.

Figure 5:
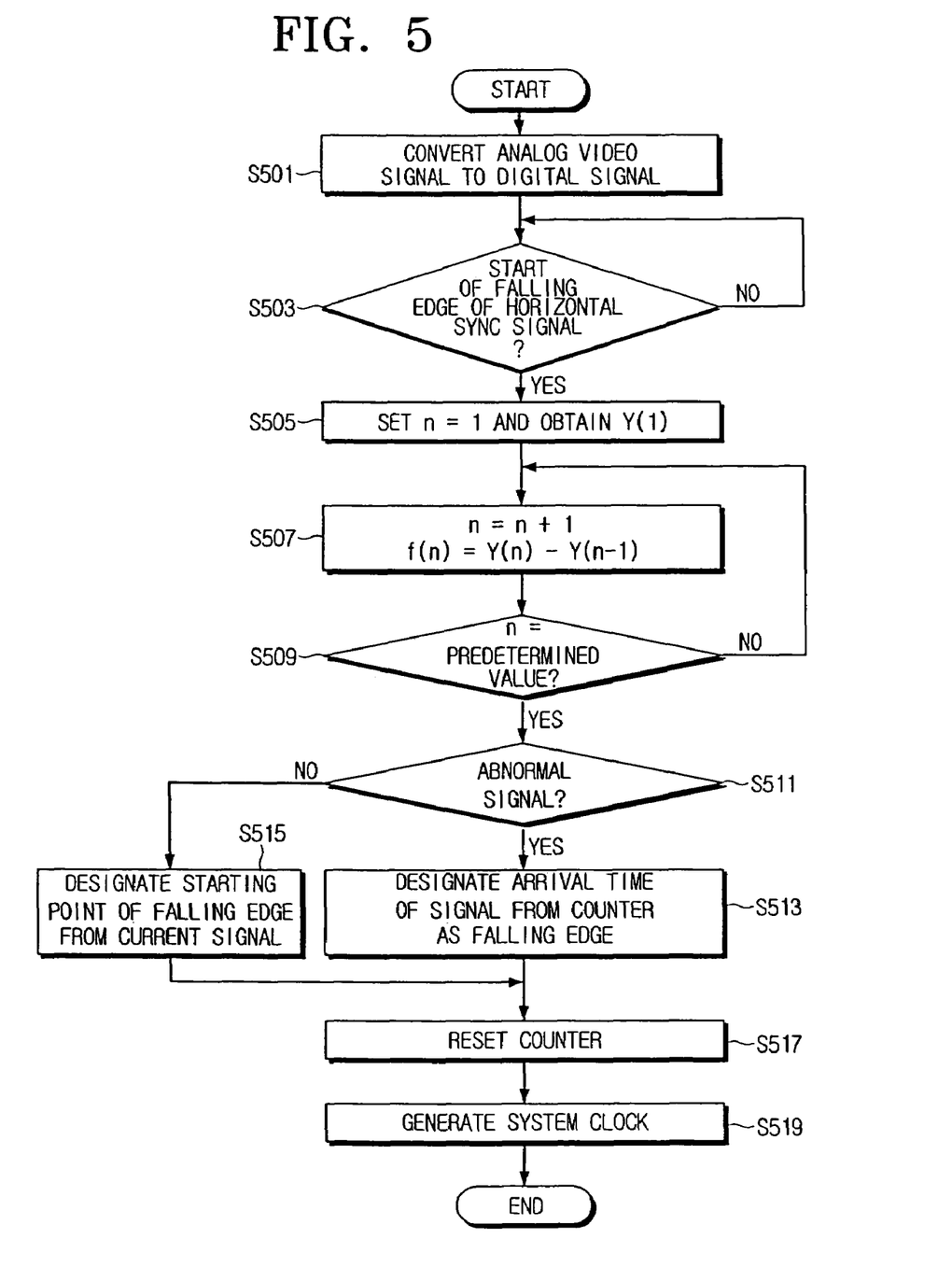
FIG. 5 is a flow chart illustrating an operation of an apparatus to extract a sync signal from an analog composite video signal according to an embodiment of the present general inventive concept.

FIG. 5 is a flow chart illustrating an operation of an apparatus, such as a sync separator, to extract a sync signal from an analog composite video signal according to an embodiment of the present general inventive concept. Referring to FIG. 1 to FIG. 5, the following will now describe the sync separating operation.

If the composite video signal is inputted, the measuring unit 303 converts the analog composite video signal into the digital signal (S501), and checks the starting point of the falling edge of the horizontal sync signal (S503).

If the starting point of the falling edge of the horizontal sync signal is found, the measuring unit 303 designates the starting point as n=1 to obtain the amplitude value Y(1) (S505).

Further, the measuring unit 303 obtains the amplitude Y(2) where n=2, and transfers the amplitude value Y(2) to the controller 307. At the same time, the controller 307 calculates the differential value f(2) (S507). The controller 307 keeps calculating the respective differential values f(n) until it receives the amplitude values Y(n) from 1 to n (S509).

The controller 307 decides whether the composite video signal is the abnormal signal, according to the calculation result of the differential values f(n). As described above, the controller 307 decides that the horizontal sync signal is abnormal or that the composite video signal is abnormal, according to the decision of whether a sum of the differential values f(n) is less than the predetermined value, or the decision of whether at least one of the differential values f(n) has the positive (+) value (S511).

If it is decided that the composite video signal is the abnormal signal, the controller 307 decides that an arrival time of the signal from the counter 305 to notify that the predetermined time has been counted, is the starting point of the falling edge, starts extracting the horizontal sync signal, and ignores a currently inputted horizontal sync signal. Also, the controller 307 adds a predetermined value to the arrival time when the signal is transmitted to generate a rising edge of the horizontal sync signal and a vertical sync signal (S513).

However, if the composite video signal is not the abnormal signal, the controller 307 extracts the horizontal sync signal from a currently input composite video signal. To this end, the controller 307 designates one of the points corresponding to the intermediate value from among the amplitude values Y(n) received up to this time as the falling edge of the horizontal sync signal. Also, the controller 307 adds a predetermined value to the arrival time of the signal to generate the rising edge of the horizontal sync signal and the vertical sync signal (S515).

Once the falling edge of the horizontal sync signal is determined, the controller 307 resets the counter 305 to start counting the predetermined time again (S517).

The controller 307 applies the same method to the rising edge for the extraction of a horizontal sync signal. The extracted horizontal sync signal by the controller 307 is inputted to the system clock generator 310. Then, the system color generator 310 generates a system clock synchronously with the input horizontal sync signal (S519).

As explained so far, the present general inventive concept is capable of extracting a horizontal sync signal even though a portion of the horizontal sync signal on the input composite video signal is distorted. Accordingly, the problems of distorted or de-shaped images on the screen caused by the distorted horizontal sync signal can be resolved. Further, the overall system synchronization becomes more stable.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of extracting a sync signal from an analog composite video signal, the method comprising:
   receiving a composite video signal including a horizontal sync signal;
   dividing a portion of a falling edge of the horizontal sync signal in the composite video signal, in which the portion is disposed between a starting portion of the falling edge and an end portion of the falling edge, into a designated number of points, and deciding whether the composite video signal is an abnormal signal, according to an amplitude value at each point; and
   if the composite video signal is the abnormal signal, generating one of the points that is obtained by adding a designated time to a falling edge of a previous sync signal, as the falling edge of the horizontal sync signal.

2. The method according to claim 1, further comprising:
   if the composite video signal is not the abnormal signal, generating one of the points having an intermediate value of the amplitude values as the falling edge of the horizontal sync signal.

3. The method according to claim 2, further comprising:
   generating a rising edge of the horizontal sync signal and a vertical sync signal after a lapse of a predetermined time from the generated falling edge.

4. The method according to claim 1, further comprising:
   generating a rising edge of the horizontal sync signal and a vertical sync signal after a lapse of a predetermined time from the generated falling edge.

5. The method according to claim 1, further comprising:
   performing a low-pass filtering to remove a high frequency noise from the composite video signal.

6. The method according to claim 1, wherein the deciding of whether the composite video signal is the abnormal signal comprises deciding whether the amplitude value keeps decreasing, and if the amplitude value starts increasing at least once, deciding that the composite video signal is the abnormal signal.

7. The method according to claim 1, wherein the number of points is calculated from sampling positions of the composite video signal according to a sampling frequency which is greater than twice of a frequency of the composite video signal.

8. The method according to claim 1, further comprising:
   converting the filtered composite video signal into a digital signal, so that the amplitude values are obtained from the digital signal.

9. An apparatus to extract a sync signal from an analog composite video signal, the apparatus comprising:
   a measuring unit to receive an analog composite video signal, to divide a portion of a falling edge of a horizontal sync signal in the composite video signal, in which the portion ranges from a starting portion of the falling edge to an end portion of the falling edge, into a designated number of points, and to obtain and output an amplitude value at each point;
   a counter to count a predetermined period of time from a falling edge of a previous sync signal; and
   a controller to compare each of the amplitude values outputted from the measuring unit with a previously received amplitude value, and if the each of the amplitude values is greater than the previously received amplitude value at least once, to decide that the composite video signal is an abnormal signal, and to generate a sync signal by designating a starting point corresponding to the predetermined period of time counted by the counter as the falling edge of the horizontal sync signal.

10. The apparatus according to claim 9, wherein, if the composite video signal is not an abnormal signal, the controller generates the sync signal by designating one of the points having an intermediate value from among the amplitude values as the falling edge of the horizontal sync signal.

11. The apparatus according to claim 10, wherein the controller calculates the predetermined time from the generated falling edge to generate a rising edge of the horizontal sync signal, and a vertical sync signal.

12. The apparatus according to claim 9, wherein the controller calculates the predetermined time from the generated falling edge to generate a rising edge of the horizontal sync signal, and a vertical sync signal.

13. The apparatus according to claim 9, further comprising:
   a low-pass filter to remove a high frequency noise from the composite video signal, and to output the filtered signal to the measuring unit.

14. The apparatus according to claim 9, wherein the number of points is calculated from sampling positions of the composite video signal according to a sampling frequency which is greater than twice of a frequency of the input composite video signal.

15. The apparatus according to claim 9, wherein the measuring unit converts the composite video signal into a digital signal, and obtaining the amplitude values from the digital signal.

16. The apparatus according to claim 9, wherein the measuring unit, the counter and the controller are implemented within a single chip.

17. An apparatus to extract a sync signal from an analog composite video signal, the apparatus comprising:
- a measuring unit to receive a composite video signal including a previous horizontal sync signal and a current horizontal sync signal, to divide a portion between starting and end portions of the current horizontal sync signal of the composite video signal into a number of points, and to measure amplitude values of the respective points; and
- a control unit to decide whether the composite video signal is an abnormal signal, according to a characteristic between the amplitude values, and to add a designated time to a falling edge of the previous horizontal sync signal to generate one of the points as a falling edge of the current horizontal sync signal.

18. The apparatus according to claim 17, wherein the control unit generates differential values between the amplitude values, and generates a characteristic of the differential values as the characteristic of the amplitude values.

19. The apparatus according to claim 18, wherein the control unit decides that the composite video signal is the abnormal signal, when the differential values are changed between a positive value and a negative value.

20. The apparatus according to claim 18, wherein the control outputs one of the points having an intermediate value of the amplitude values as a starting point of the falling edge of the horizontal sync signal when the differential values are not changed between a positive value and a negative value.

* * * * *